United States Patent
Duchene et al.

(10) Patent No.: US 10,234,836 B2
(45) Date of Patent: Mar. 19, 2019

(54) METHOD FOR OPERATING A CONTROL DEVICE OF A HOME AUTOMATION INSTALLATION OF A BUILDING AND CONTROL DEVICE

(71) Applicant: SOMFY SAS, Cluses (FR)

(72) Inventors: Isabelle Duchene, Marignier (FR); Frédéric Devis, Epagny (FR); Pierre-Yves Cogne, Bogeve (FR)

(73) Assignee: SOMFY SAS, Cluses (FR)

( * ) Notice: Subject to any disclaimer, the term of this patent is extended or adjusted under 35 U.S.C. 154(b) by 208 days.

(21) Appl. No.: 14/744,810

(22) Filed: Jun. 19, 2015

(65) Prior Publication Data

US 2015/0370230 A1    Dec. 24, 2015

(30) Foreign Application Priority Data

Jun. 20, 2014    (FR) ...................................... 14 55713

(51) Int. Cl.
*G05B 21/00*    (2006.01)
*G01M 1/38*    (2006.01)
(Continued)

(52) U.S. Cl.
CPC .......... *G05B 15/02* (2013.01); *G05B 19/0426* (2013.01); *G06F 3/0482* (2013.01);
(Continued)

(58) Field of Classification Search
CPC . G05B 15/02; G05B 19/0426; G06F 3/04817; G06F 3/0482; G06F 3/04842; H04L 12/2816
See application file for complete search history.

(56) References Cited

U.S. PATENT DOCUMENTS 6,061,602 A * 5/2000 Meyer ................ G05B 19/0426
700/83
6,912,429 B1 * 6/2005 Bilger .................. G08B 25/008
236/49.3
(Continued)

FOREIGN PATENT DOCUMENTS

CN    1767475 A    5/2006
CN    103197633 A    7/2013
(Continued)

OTHER PUBLICATIONS

European Search Report and Written Opinion dated Feb. 16, 2016, issued in corresponding application No. EP15172735; w/English partial translation and partial machine translation (15 pages) (EP2631723 cited in the ESR and corresponding US20130226316 are not listed in this IDS since they were listed in a previous IDS on Jun. 19, 2015).

(Continued)

*Primary Examiner* — Thomas C Lee
*Assistant Examiner* — Zhipeng Wang
(74) *Attorney, Agent, or Firm* — Westerman, Hattori, Daniels & Adrian, LLP

(57) ABSTRACT

A method for operating a control device of a home automation installation of a building, the control device comprising a data input device and a display device, the control device being configured so as to control the operation of home automation equipment items and communicate with sensors, the method including automatic operation configuration steps of selecting an icon representing a first condition for implementation of an action relating to the installation out of a proposed set of condition icons, positioning the first selected condition in a matrix table accommodating the condition icons, selecting an icon representing a second condition for implementation of an action relating to the installation, and positioning the icon representing the second (Continued)

condition on a same row or a same column as the icon representing the first condition in the matrix table.

30 Claims, 6 Drawing Sheets

(51) Int. Cl.
    *G05B 13/00*     (2006.01)
    *G05B 15/00*     (2006.01)
    *G05D 23/00*     (2006.01)
    *G05B 15/02*     (2006.01)
    *G05B 19/042*     (2006.01)
    *G06F 3/0481*     (2013.01)
    *G06F 3/0482*     (2013.01)
    *G06F 3/0484*     (2013.01)
    *H04L 12/28*     (2006.01)

(52) U.S. Cl.
    CPC ...... *G06F 3/04817* (2013.01); *G06F 3/04842* (2013.01); *H04L 12/2816* (2013.01)

(56) References Cited

U.S. PATENT DOCUMENTS

| | | | | |
|---|---|---|---|---|
| 2005/0004911 | A1* | 1/2005 | Goldberg | G06F 17/30398 |
| 2006/0052884 | A1* | 3/2006 | Staples | G05B 19/0426 |
| | | | | 700/83 |
| 2010/0289643 | A1* | 11/2010 | Trundle | F24F 11/0086 |
| | | | | 340/545.1 |
| 2011/0051177 | A1* | 3/2011 | Sugawara | G03G 15/36 |
| | | | | 358/1.15 |
| 2012/0310386 | A1* | 12/2012 | To | G05B 15/02 |
| | | | | 700/83 |
| 2013/0226316 | A1 | 8/2013 | Duchene et al. | |
| 2013/0290925 | A1* | 10/2013 | Shankar | G06F 9/4498 |
| | | | | 717/105 |

FOREIGN PATENT DOCUMENTS

| | | |
|---|---|---|
| EP | 2 482150 A1 | 8/2012 |
| EP | 2 631 723 A2 | 8/2013 |
| WO | 2010/135372 A1 | 11/2010 |

OTHER PUBLICATIONS

French Search Report and Written Opinion dated Feb. 20, 2015, issued in corresponding application No. FR1455713; w/English partial translation and partial machine translation (12 pages).

Chinese Office Action and Search Report dated Sep. 20, 2018 in counterpart application No. CN 2015103453455; w/English translation (11 pages) (D1-D3 cited in the Chinese Office Action, EP2482150, EP2631723 and US20050004911 are not listed in this IDS since they were listed in a previous IDS filed Jun. 8, 2016, a previous IDS filed Jun. 19, 2015, and the Office Action dated May 1, 2018, respectively).

* cited by examiner

METHOD FOR OPERATING A CONTROL DEVICE OF A HOME AUTOMATION INSTALLATION OF A BUILDING AND CONTROL DEVICE

The present invention relates to a method for operating a control device of a home automation installation of a building, a control device of a home automation installation of a building and such an installation.

Generally, the present invention relates to the field of home automation installations. A home automation installation is generally designed in such a way as to operate home automation equipment items, such as, for example, closing, privacy or solar protection devices comprising a motorized driving device moving a screen between at least one first position and at least one second position, lighting devices, heating devices and/or an anti-intrusion security device, by using data collected by sensors, such as, for example, temperature, brightness, wind, humidity, presence, opening and/or smoke sensors.

A motorized driving device for a closure, privacy or solar protection device comprises an electromechanical actuator of a screen or mobile closure, privacy or solar protection element such as a shutter, a door, a grid, a blind, or any other equivalent equipment.

A home automation installation also comprises a control device. The control device comprises at least one local control unit, that can send commands to different equipment items, by wired or wireless link, so as to control the home automation equipment items of the home automation installation. The local control units are associated respectively with each of the home automation equipment items of the home automation installation. The home automation equipment items thus correspond to electrical loads that can be remotely controlled.

The control device also comprises a terminal, the terminal comprising a data input device and a display device. The terminal is conventionally a touch pad making it possible notably to enter input data to set the home automation equipment items into operation and display a state of operation of these home automation equipment items.

Control devices of a home automation installation are already known. These control devices comprise a terminal provided with a data input device and a display device, the display device having a graphic representation screen showing the different equipment items in icon form. The terminal is, for example, a touch screen which de facto combines the data input device and the display device. The control device is configured so as to control the operation of the home automation equipment items, in particular by using scenarios or scenes, which are a set of commands supplied to one or more equipment items chosen to participate in the scenario, the commands being executed simultaneously or in succession.

It is also known practice to give a user the option to program his or her own scenarios, notably by using a databank of icons representing equipment items and/or possible commands, such as "open", "close". These scenarios, associated with a timetable, are then implemented when the current time corresponds to the programmed time of the scenario.

The aim of the present invention is to improve the control devices of the prior art and propose a method for operating a control device of a home automation installation with which a building and the environment of this building is equipped, and an associated control method, making it possible to simplify the creation and the display of complex conditional control commands. In particular, the present invention makes it possible to optimize the supply of multiple conditions and actions.

To this end, the present invention targets a method for operating a control device of a home automation installation of a building and of the environment of the building. The home automation installation comprises a plurality of home automation equipment items and sensors placed in living areas inside and/or outside the building. The control device comprises a data input device and a display device. The display device comprises a graphic representation screen. The control device is configured so as to control the operation of the home automation equipment items and communicate with the sensors. The method comprises at least the following automatic operation configuration steps:

selection of an icon representing a first condition of implementation of an action relating to the installation out of a proposed set of condition icons, positioning of the first selected condition in a matrix table accommodating the condition icons, selection of an icon representing a second condition of implementation of an action relating to the installation, positioning of the icon representing the second condition on a same row or a same column as the icon representing the first condition in the matrix table.

The present invention aims to propose multi-conditional control commands, with multiple conditions, notably by proposing conditions separated by logical ANDs and conditions separated by logical ORs. The selection and the positioning of the conditions is done in a very ergonomic manner for the user, who selects an icon representative of one condition out of a set of icons and positions it in a matrix. The automatic operation is thus defined by at least two conditions of implementation of an action (which can be combined by a logical AND or by a logical OR), and by the corresponding action. The selection of the corresponding action (or of the corresponding actions) is defined during a selection step.

Besides the clarity provided by the matrix form of the set of conditions, this configuration provides a programming logic that is very simple for the user and for the recovery of information by the control device.

The first and second conditions can be separated by a logical OR and/or the first and second conditions can be separated by a logical AND depending on whether the condition icons are positioned respectively in a row or in a column.

In the matrix table, the rows can represent the conditions separated by logical ORs, the columns can represent the conditions separated by logical ANDs.

The selection of the icon representing the second condition can be dependent on the first condition selected.

The choice of a first condition can establish a restriction on the possible choice of a second condition having to be applied to the same action or to the same group of actions. A particular first example can be envisaged: if the first condition and the second condition are separated by a logical OR, then they must be of the same type. A particular second example can be envisaged: if the first condition and the second condition are separated by a logical AND, then they must be of different type, notably in the case where the condition relates to one and the same object (for example a condition of temperature measured by a same sensor). Optionally, the set of icons can be determined by the control device. In particular, in the choice of a second condition, the proposed set of icons, that the user can select, is defined by the control device in such a way that there can be no contradiction between the first and the second condition. Thus, the second set of icons can be identical to, or more restricted than, the first set of icons. In the case where the second set of icons remains identical to the first set of icons, it may concern a case where the first condition will have been defined as compatible with all of the other conditions. The method will be able to comprise a step of refusal to position a second icon if the latter does not conform to the restriction rules.

The steps of selection and of positioning can be reiterated as many times as there are number of conditions desired for the implementation of the action.

The display screen can make it possible to select condition icons, that will be possible to assign to dedicated locations, either in such a way that the conditions are separated by logical ANDs, or that they are separated by logical ORs.

The number of possible conditions, separated by a logical AND, can be less than or equal to 3.

In a device where the user has the option to select various conditions, it may be necessary to limit the possible alternative conditions so as to limit the possibilities of selecting contradictory conditions. The number of possible conditions separated by a logical OR can also be limited to 3, even limited to 2. Mostly, 2 conditions separated by a logical OR will be sufficient. Thus, on a condition relating to temperature, it will be possible to select 2 or 3 temperature bands which will produce the implementation of the same actions. Thus, the total number of possible conditions remains significant while structuring these various possibilities. The matrix table thus preferentially comprises 3 rows and 2 columns.

A condition may be chosen from the types of conditions defined relative to the following information:
  time information,
  weather or climate information,
  installation equipment item position or status information, for example position of a bottom extremity of a screen or closed or open status of a screen,
  sensor measurement information or sensor status information,
  information relating to a user,
  localisation information, notably localisation information of a control element, particularly geographic position information of a remote control unit.

The method can comprise at least one step of parameterizing the first condition and/or the second condition selected.

The method can comprise at least one step of selection and of positioning of an icon representing a first action relating to the installation out of a first proposed set of actions.

The step of selection of an action can be performed before the steps of selection of the conditions relating to this action. This participates in an intellectual approach aiming to define the desired result (the action or the actions to be implemented), then to define the extent to which this result must be implemented. For example, the aim may be to be woken up by a gradual opening of the shutter and a starting up of the heating. These actions will therefore be able to be selected. Then, the user will be able to select the conditions such as the wake-up time, what days these actions must be performed and whether the operation must be linked to a particular outdoor temperature for example, to avoid opening the shutters when it is very cold. Alternatively, the selection of the actions may follow the condition selection steps. This allows for a reverse intellectual approach, in which the surrounding conditions are defined, the action selected later being a response to these surrounding conditions. For example, the aim may be to implement a thermal regulation in the building, in cases where the indoor temperature is below 3° C. in winter and if a person is present in the home. The temperature, seasonality and presence conditions can therefore be selected. Then, the user defines the response to be given to these conditions: close the rolling shutters of the north, east and west façades and increase the setpoint temperature of the heating by 1° C.

Alternatively, the action selection and condition selection steps may be performed without any order defined.

The step of selection and of positioning of an action can be reiterated as many times as there are number of actions desired for one and the same set of conditions.

In the same way as for the conditions, the number of possible actions will be able to be limited to 3. This makes it possible to generate a display of the multi-conditional control commands in a single format and avoid redimensioning the display when the number of conditions and/or actions increases. This thus makes it possible to define hardware and software resources, notably the screen size, suitable for displaying the maximum number of possibilities, which are unique regardless of the selections of conditions and/or of actions.

The selection of a second action may be dependent on the first action selected.

So as to limit the contradictions between different actions associated with a same set of conditions, a determination may be made that the different actions selected can be only of different types. Alternatively, it will be possible to set this constraint only for a type of action, for example, the selection of a scenario. Thus, it is possible to keep the possibility of being able to control different independent equipment items, without necessarily creating any groups specific to a multi-conditional control command.

An action can be chosen from the following types of actions:
  change of state of an equipment item, activation of a preprogrammed mode of operation of the installation,
  launching of a scenario,
  sending of an alert.

The steps of selection and of positioning may comprise a step of dragging and dropping an icon from a set to a display area.

The aim here is programming simplicity, notably compared to pop-up menus. The same icon can be reused both in the possible options and in the display of the conditions selected during the creation or programming of an automatic operation. This allows for a graphic consistency and a limitation of the software resources.

The selection step may involve the opening of a separate graphic window comprising parameterizing information. The parameterizing step is not necessarily performed after each condition selection, it can take place at any time during the programming. The creation of a graphic window separated from the programming screen avoids the constraints linked to step-by-step menus and allows for versatility of use. This parameterizing step may be avoided by using default parameters for part or all conditions.

The method can comprise a step of display of an automatic operation icon and of different condition type icons associated with the automatic operation, the condition type icons representing the types of conditions of implementation of the automatic operation separated by a logical AND.

In a step of display of an automatic operation programmed during the configuration steps, the automatic operation can be represented in its configured form. In this display step, it will not thus be necessary to represent all the conditions of implementation of an action, but only the conditions separated by a logical AND, in other words, the possible condition types separated by logical ANDs, and not the conditions separated by logical ORs (in particular because of the type of restriction on the logical OR conditions, as defined above). The number of conditions displayed should therefore be less than or equal to the number of conditions selected. Similarly, the actions relating to the automatic operation are not displayed. This arrangement simplifies the display, makes it possible to display, on one and the same screen, a plurality of complex automatic operations and their associated conditions. It is a dashboard of the programmed automatic operations. Ideally, all the programmed and active automatic operations can be displayed on one and the same screen.

The method can comprise a step of display of all of the configured automatic operations, this display step being able to comprise a step of highlighted display of icons representing the active conditions and/or a step of highlighted display of icons representing conditions for which the status is defined as true.

When the control device receives the information useful for determining whether the conditions are fulfilled, the display of the icons representing the conditions can be modified to show whether the corresponding condition or one of the conditions separated by a logical OR is fulfilled. This modification can, for example, be a change of colour of the icon or a highlighting of the icon associated with a condition or with a set of conditions separated by a logical OR. An absence of display modification may otherwise show that no condition is fulfilled.

In the example in which the conditions separated by a logical AND are of different type, there can be no risk of confusion between a fulfilled condition of a first type and another unfulfilled condition of the same type. This simplifies the implementation of the display, in as much as there is no need to adjust indications specifying, for example, the parameterizing of the condition. This also simplifies the icons representative of the conditions selected.

The method can comprise steps of activation and of deactivation of a configured automatic operation.

A configured automatic operation is preferentially active by default when it has just been created. However, a user can choose to activate or deactivate one or more programmed automatic operations. For this, there may be, on the control interface, in particular on a screen displaying the list of programmed automatic operations, a selector for activating or deactivating each automatic operation.

The method can comprise the provision of at least one preconfigured automatic operation.

A user can activate or not activate this preconfigured automatic operation, or modify it to adapt it to his or her own practices. Preferentially, a didactive approach for understanding and using this preconfigured automatic operation can be implemented, notably through a display screen showing the benefits in terms of heat, energy efficiency or building security.

A control device of a home automation installation of a building and of the environment of the building comprises a data input device and a display device, the display device comprising, for example, a screen. The control device comprises hardware and/or software elements for implementing said operating method defined previously, notably an element for selecting an icon, an element for positioning the selected icon on an area of the graphic representation screen and a computation element determining a list of icons or of parameters to be displayed as a function of the selected icon or icons.

The control device can comprise a terminal, said terminal comprising the data input device and the display device.

The terminal can be a mobile terminal, in particular a touch pad or a smartphone.

The invention also relates to a data storage medium, readable by a computer, on which is stored a computer program comprising computer program code elements for implementing the steps of the operating method defined previously.

The invention further relates to a computer program comprising a computer program code element suitable for performing the steps of the operating method defined previously, when the program runs on a computer.

The invention relates finally to a home automation installation of a building and of the environment of the building comprising a plurality of home automation equipment items and sensors placed in living areas inside and outside the building, the home automation installation comprising a control device defined previously, the installation comprising a communication device through which the control device can drive the equipment items and the sensors of the installation by the implementation of a programmed automatic operation.

Other particular features and advantages of the invention will become more apparent from the following description.

The attached drawing represents embodiments of a control device according to the invention and methods for executing an operating method according to the invention.

Figure 1:
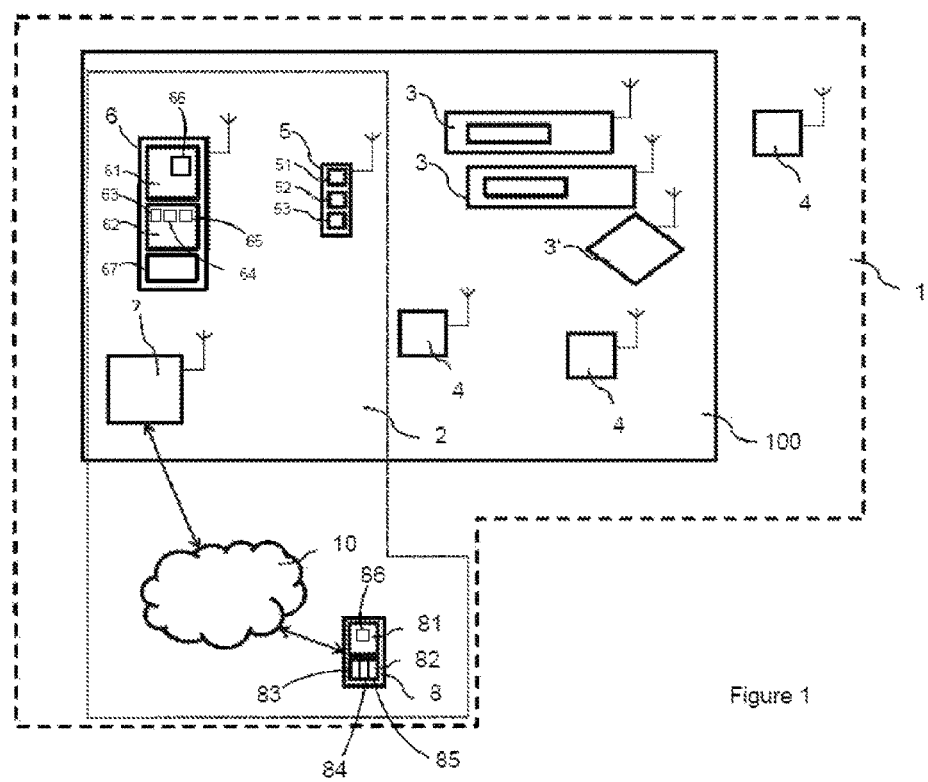
FIG. 1 is a diagram of an embodiment of a home automation installation according to the invention.

A home automation installation conforming to an embodiment of the invention will first of all be described, with reference to FIG. 1.

The home automation installation 1 comprises elements such as a control device 2, a plurality of home automation equipment items 3, 3' and sensors 4 placed in living areas inside and outside a building 100.

The home automation equipment items 3, 3' can be of different types, such as, for example:
  closure, privacy or solar protection devices comprising motorized driving devices moving screens or mobile elements between at least one first position and one second position; and/or
  lighting devices; and/or
  heating devices; and/or
  an anti-intrusion security device such as an alarm.

These equipment items can be controlled by using data collected by sensors 4, such as, for example, temperature and/or brightness and/or wind and/or humidity and/or motion and/or smoke sensors. The home automation equipment items can themselves comprise sensors. These equipment items can alternatively or complementarily be controlled by using data supplied by a clock.

In one embodiment, the motorized driving device for the closure, privacy or solar protection devices comprises an electromechanical actuator of a screen or mobile closure, privacy or solar protection element such as a shutter, a door, a grid, a blind, or any other equivalent equipment.

The home automation installation 1 also comprises the control device 2.

The control device 2 can comprise one or more local control units 5, such as, for example, a remote control comprising a number of control keys 51, 52, 53, associated with one or more of the home automation equipment items 3, 3' and communicating therewith, notably via a radio protocol. The control device also comprises a central control unit 6 communicating, by wired or wireless link, with the local control units 5 and/or with the home automation equipment items 3, 3' and/or with the sensors 4 of the home automation installation 1.

The control device can also comprise a remote control unit 8. The latter communicates with the home automation equipment items and/or the sensors of the installation through a remote network 10 via Internet and through a connection box 7. The connection box 7 is also connected to the remote network 10 via Internet. Thus, the remote control unit 8 notably makes it possible to enter input data so as to switch on home automation equipment items 3, 3' and display a state of operation of these home automation equipment items 3, 3'. Preferentially, the remote control unit 8 is a mobile terminal, in particular a touch pad or even a smartphone. The home automation equipment items 3, 3' thus correspond to electrical loads that can be controlled locally and remotely. For the intercommunication of the different elements of the installation, the latter are provided with transmitters and/or receivers for control commands or information, preferentially transmitted according to a protocol over a wireless network, notably radio. The communication implemented between the elements of the installation can be either of one-way type, that is to say that an element which transmits information cannot receive data, or of two-way type, that is to say that an element which transmits information can also receive information.

Each of the sensors 4 measures a physical quantity and sends, to a receiver of the control device 2, in particular either to a local control unit 5 or to the central control unit 6, or a receiver of a home automation equipment item 3, 3', data relating to the measured quantity. The data can be of binary type to signal a state of operation, for example according to a predetermined threshold, or even of numerical type to indicate a measured value.

The control device 2 is configured so as to control the operation of the home automation equipment items 3, 3' and communicate with the sensors 4.

The different elements of the installation comprise electronic control units, for example a printed circuit provided with a microcontroller and a memory, so as to be able to perform computations and store data, notably so as to govern their operation, and manage the communications through the transmitters and receivers.

The central control unit 6 comprises a display device 61, notably a display screen, an input device 62 and a computation element or processing logic unit 67.

The input device 62 comprises a selection element 63, a positioning element 64 and navigation and validation elements 65. The display device comprises display elements 66.

Similarly, the remote control unit 8 comprises a display device 81 and an input device 82, as well as a selection element 83, a positioning element 84, navigation and validation elements 85 and display elements 86.

In one embodiment, the selection element, the positioning element and the display elements of the central or remote control unit are implemented by means of a touch screen 61.

Obviously, the embodiment of the selection, positioning and display elements is in no way limiting and can be different, in particular implemented by means of pushbuttons or sensitive keys for the selection element and the positioning element or by means of an LCD (Liquid Crystal Display) or TFT (Thin Film Transistor) display for the display element.

Together, the electronic control units, the home automation elements of the installation and the transmitters and receivers constitute a communication device through which the control device can transmit information to the equipment items and the sensors of the installation, can receive information from the equipment items and from the sensors of the installation and implement a configured automatic operation.

Figure 2:
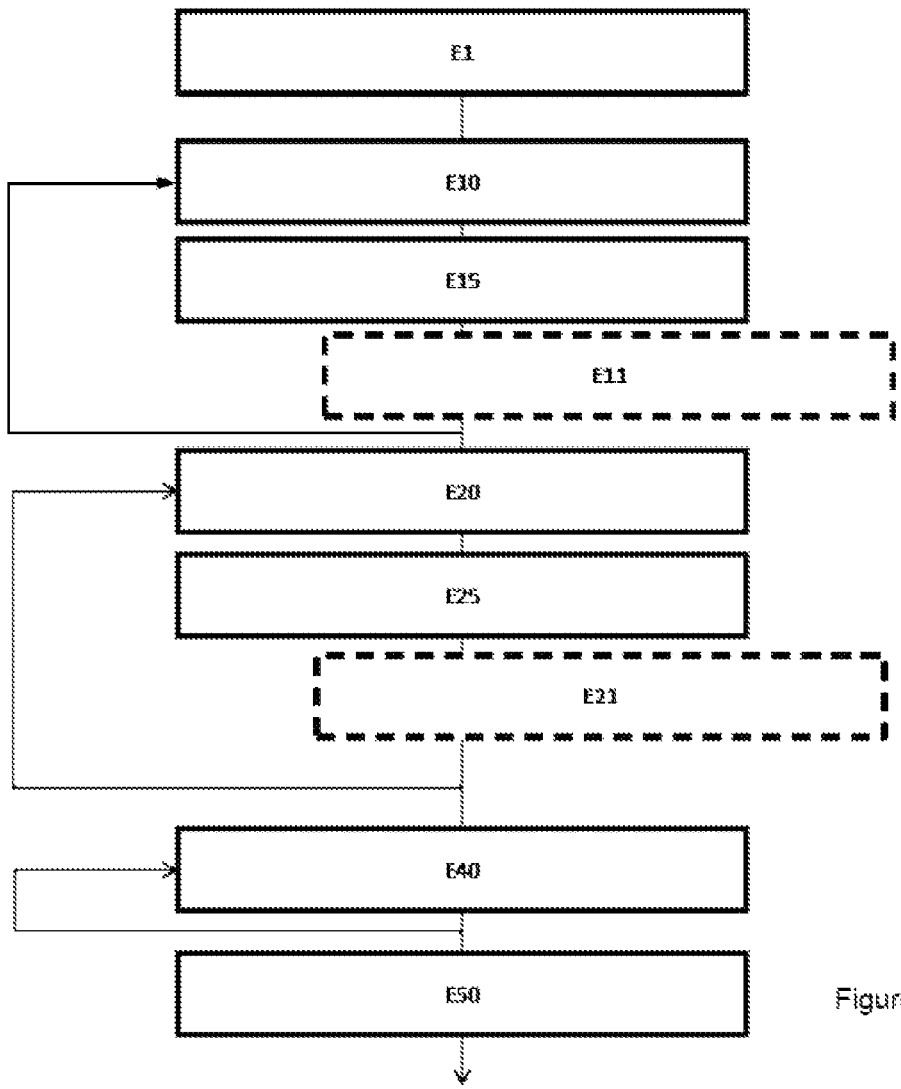
FIG. 2 is a flow diagram of an embodiment of an operating method according to the invention.

Throughout this document, "automatic operation" should be understood to mean a set of at least one action or command that can be executed by a home automation equipment item and at least one condition of execution of this action or command. This set is generated by a selection of icons representative of the action, of the command or of the condition. The activation of the automatic operation provokes the implementation of the action or of the command subject to condition. FIG. 2 illustrates the steps of one mode of execution of a method for configuring an automatic operation, notably a new automatic operation. This new automatic operation is generated during a step E1. However, the subsequent steps are at least partially similar in the case of the modification of an existing automatic operation.

These configuration steps comprise a step of selection E10 of a first condition icon, that is to say a first icon representing or associated with a first condition of implementation or of execution of an action relating to the installation out of a proposed set of condition icons COND.

A condition icon is defined notably by a condition type and by one or more values, for example a range of values. It is represented by a graphic icon and, possibly, an associated alphanumeric text.

The conditions can be chosen from condition types for example defined in relation to the following information:
 time or timetable information,
 weather or climate information,
 installation equipment item position or status information, for example position of a bottom extremity of a screen or closed or open status of a screen,
 sensor measurement information or sensor status information,
 information relating to a user,
 localisation information, notably localisation information of a control element, i.e. geographic position information of a remote control unit.

The selection can be made notably by:
 positioning a cursor on the icon and, possibly, a subsequent validation step; or
 pressure or contact exerted by a user on an area of the screen where the icon is displayed. Any other selection procedure can be used. To perform this selection, the user uses the selection element 63.

Once the condition icon is selected, the latter, during a positioning step E15, is positioned in or moved into a matrix table TMAT intended to accommodate the condition icons. This matrix table notably comprises areas C1-C6 arranged in rows and columns and on which the first selected icon can be positioned. The rows and columns can be arranged orthogonally. Alternatively, they can form an angle other than 90°. In practice, the first icon will be positioned in the top left area of the matrix table, manually or automatically. Alternatively, no constraint is applied to the positioning of this first icon in the matrix table. The positioning can be done notably by:

moving a point of contact between the user and the screen from an area of the screen where the icon is displayed to an area C1-C6. The icon then remains positioned in the area C1-C6 where the contact was broken between the user and the screen, in particular between the user and the positioning element 64. A subsequent validation step may possibly be required.

To perform this positioning, the user uses the positioning element 64.

These selection and positioning steps can be followed immediately or later by a step E11 of parameterizing of the first selected condition. In this step, the user will for example define a numeric or logical value relating to the information associated with the condition, this value making it possible to determine when the condition is applied and when it is not.

A new step of selection E20 of a second condition icon, representing a second condition of implementation of an action relating to the installation is then implemented. Once the second condition icon is selected, the latter is positioned during a second step of positioning E25 in the matrix table TMAT accommodating the condition icons. This second icon can then be positioned on a same row or a same column as the icon representing the first condition in the matrix table. As for the first icon, a step E21 of parameterizing of the second selected condition can take place.

In the case where the icons are positioned on a same row of the matrix table, the two conditions corresponding to the icons of the table are considered to be linked by a logical "OR". In the case where the icons are positioned on a same column of the matrix table, the two conditions corresponding to the icons of the table are considered to be separated by a logical "AND". A reverse logic can however be considered. The logic by which conditions are read is defined previously. It is for example set permanently and/or during the production of the central control unit 6. Thus, the order in which the icons are read, but also the priorities of the logical links relative to one another can be set previously, notably during the production and/or permanently. For example, if it is assumed that icons associated with conditions C1 to C6 respectively arranged on areas C1 to C6 are read according to the logical formula:

(C1 OR C4) AND (C2 OR C5) AND (C3 OR C6)

The matrix table preferentially comprises 3 rows and 2 columns.

Restrictions can be applied to the selection or the positioning of the icon representing the second condition, notably as a function of the first selected condition. In particular, a type restriction can be applied: the conditions separated by logical ORs are preferentially constrained to be conditions of the same type. For example, if a first temperature condition is selected, then a second temperature condition will be able to be selected and positioned in the matrix table on a same row (the two conditions then being separated by a logical OR). On the other hand, a second brightness condition will not be able to be positioned on this same row.

The conditions separated by logical ANDs are preferentially constrained to be conditions of different type. For example, if a first temperature condition is selected, then a second timetable condition will be able to be selected and positioned in the matrix table on a same column (the two conditions then being separated by a logical AND). On the other hand, a second temperature condition will not be able to be positioned on this same column, but rather on another line.

Steps of selection E20 and of positioning E25 are reiterated as many times as there are number of conditions desired for the implementation of the action. A restriction on the number of conditions can be given by the dimensions (number of rows and columns) of the matrix table. The set of selected conditions forms a compound condition.

The method also comprises at least one step of selection and positioning E40 of an icon representing a first action relating to the installation out of a first proposed set of actions ACT. This action is associated with the compound condition contained and defined in the matrix table TMAT from at least two individual conditions represented by icons.

An action can be chosen from the following types of actions:

change of state of an equipment item, activation of a preprogrammed mode of operation of the installation,
launching of a scenario,
sending of an alert.

This step E40 can be performed before or after the step or steps of selection E10, E20 and of positioning E15, E25 of the conditions. The selected action icon is positioned in an actions table TACT, comprising areas A1, A2, A3 arranged in a column and on which the selected action icon can be positioned. These selection and positioning steps are reiterated as many times as there are number of actions desired for the implementation of the automatic operation. A restriction on the number of actions may be dictated by the dimensions (number of columns) of the actions table. The techniques for selecting and positioning the action icons can be the same as those used for the selection and positioning of the condition icons.

Restrictions may also be applied to the selection or the positioning of icons representing actions, notably as a function of a first selection of an action icon. It may be determined that the different actions selected can be only of different types. Alternatively, this constraint may be set only for a type of action, for example the launching of a scenario. Thus, it is possible to retain the possibility of being able to control different independent equipment items, without necessarily creating any specific group for a same set of conditions.

When all the desired conditions and actions are positioned in the matrix table TMAT and in the actions table TACT, and the conditions are parameterized according to the wishes of the user of the building 100, a step E50 of storage of the configuration of the automatic operation takes place.

During this mode of execution of the method, the selection and positioning steps can therefore comprise a step of dragging-dropping an icon from a set of conditions COND or from a set of actions ACT to a display area of the matrix table or of the actions table.

Figure 3:
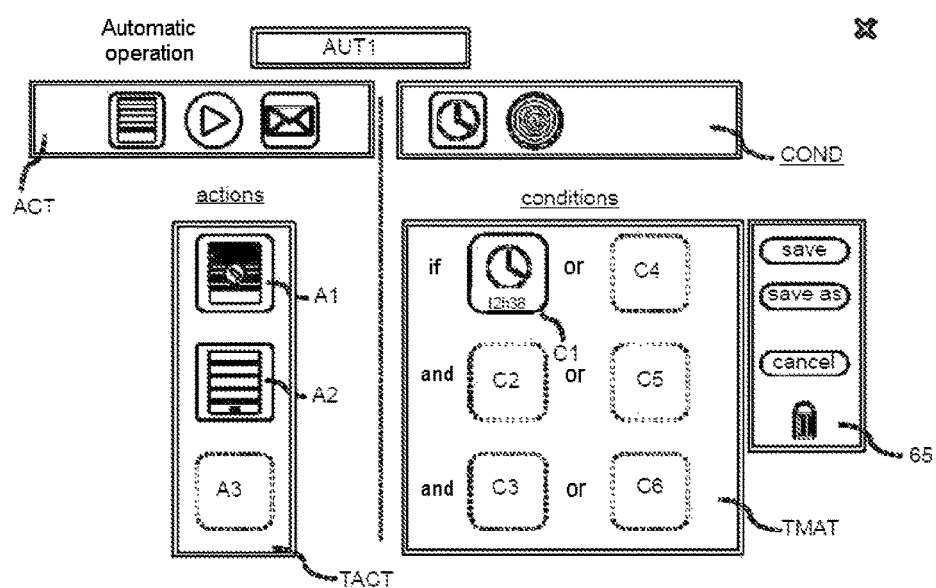
FIGS. 3 to 6 are display views of a screen of the control device in different situations.

FIG. 3 represents a view of the display screen during the configuration of a new automatic operation. Two action icons, from the set of action icons ACT, have been selected and positioned in areas A1 and A2 of the actions table intended to accommodate action icons. A timetable condition icon has been selected and positioned in the area C1 of the matrix table. The other areas are empty.

A selection element can be a pointer or cursor or an element for detecting a finger of a user in the case of a touch screen. An icon is then copied from a set of conditions COND or actions ACT, to an area of the conditions matrix table or the actions table. Navigation and validation elements 65 are also represented. The latter are used notably to save the configured automatic operation, to delete the latter or to cancel an unwanted positioning.

Figure 4:
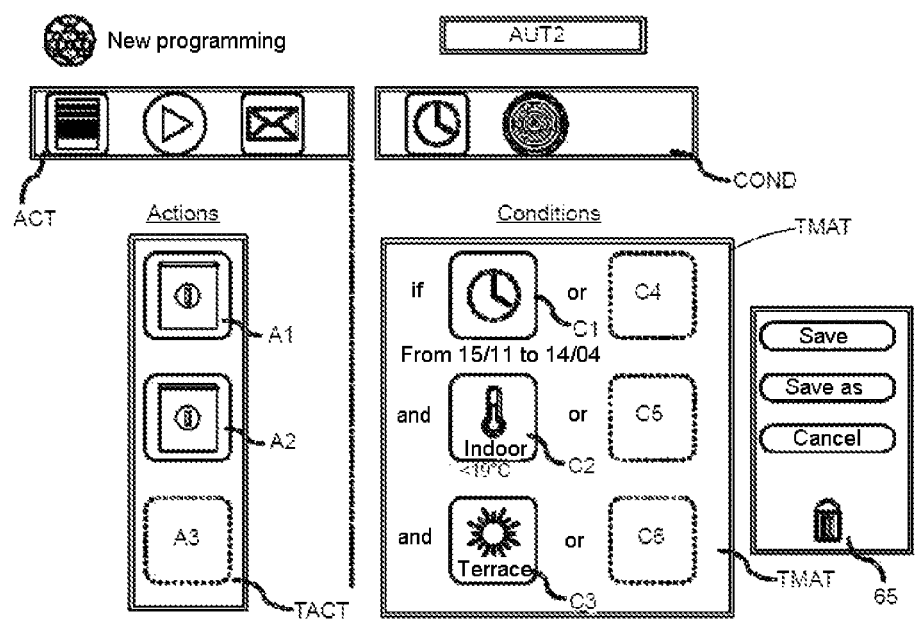

FIG. 4 represents another view of the display screen during the configuration of a new automatic operation. Two action icons, from the set of action icons ACT have been selected and positioned in the areas A1 and A2 of the actions table. A first timetable condition icon has been selected and positioned in the area C1 of the matrix table. A second temperature condition icon has been selected and positioned in the area C2 of the matrix table. A third sunlight condition icon has been selected and positioned in the area C3 of the matrix table. These three icons are of different types and are separated by logical ANDs. They therefore observe any type restriction concerning the icons separated by logical ANDs. In practice, these conditions cannot be of the same type. If the last selected icon was of the same type as one of the first or second condition icons of the matrix table, then its positioning in the area A3 could be refused.

Similarly, if a new condition icon was selected and positioned on the same row as another condition and these two icons are of different type, then the positioning of the new icon on the row could be refused.

Upon such refusals, an error message could be transmitted to the user explaining the restriction on the different conditions.

Upon the execution of the automatic operation, the different actions can be executed simultaneously or in succession.

Figure 5:
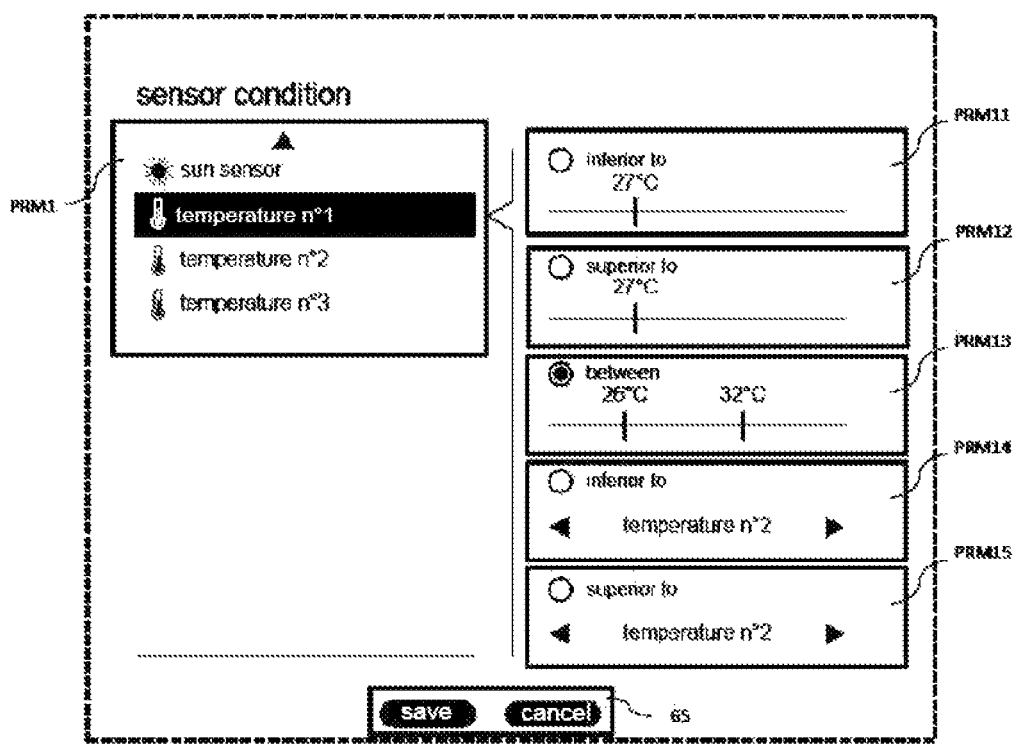

FIG. 5 represents a parameterizing screen, in the form of a separate graphic window comprising parameterizing information. This graphic window displays a first selectable parameterizing level PRM1, which can correspond notably to a choice of information, notably physical measurement, associated with the sensor. In the example, the first parameterizing level corresponds to a temperature level for a solar sensor. The second parameterizing level corresponds to a temperature value or a range of temperature values. This second parameterizing level comprises a number of options PRM11-PRM15 that can be selected by the person performing the configuration of the automatic operation. For each option PRM11-PRM15, the value or the values of the bounds of the ranges can be modified by simply dragging the cursor onto a row or by entering a value.

The graphic window also displays navigation and validation elements 65, that make it possible to save the parameterizing or cancel the parameterizing modifications.

Figure 6:
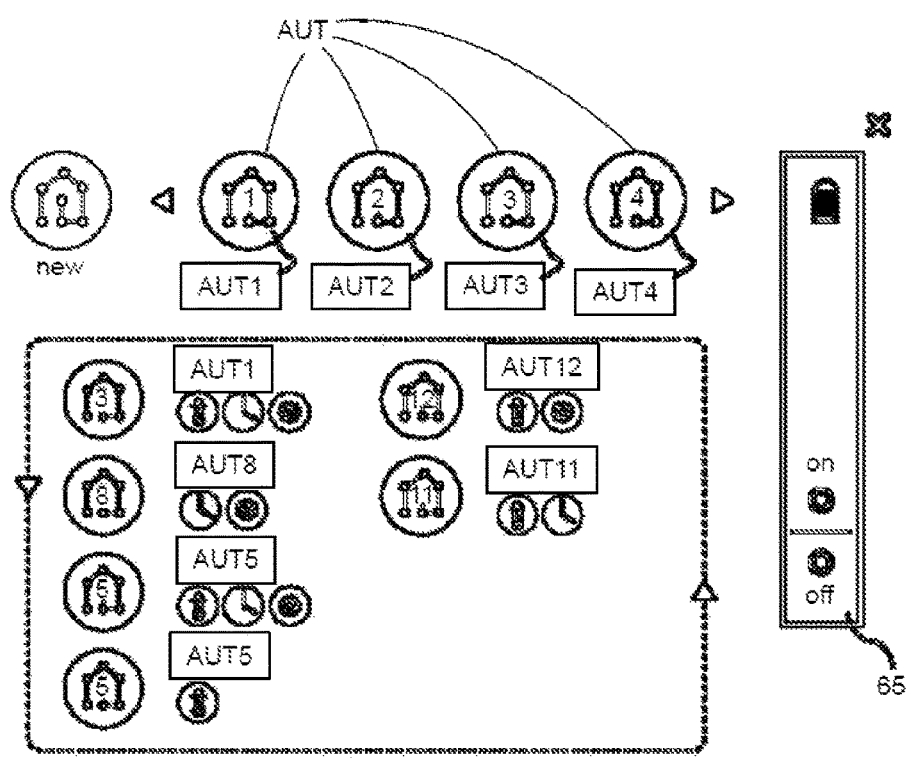

FIG. 6 illustrates a step of display of the different automatic operations configured and saved. Each automatic operation is characterized by an icon AUT and a text naming the automatic operation. Different condition icons associated with the automatic operation are displayed in proximity to the automatic operation icon. Of the condition icons, only the icons representing the types of conditions of implementation of an action separated by a logical AND are represented. The action icons are also not represented.

This display step therefore consists in offering a dashboard of the different active automatic operations, and makes it possible to view in particular whether one or other or all of the conditions are fulfilled. For this, the display of each condition icon relating to an automatic operation can be modified to show whether the corresponding condition C1, C2, C3 (or one of the conditions separated by a logical OR) is fulfilled. This modification can be a highlighting of the icon, for example a change of colour of the icon associated with a condition or with a set of conditions separated by a logical OR. An absence of modification of display otherwise indicates that the condition is not fulfilled.

During this display step, navigation and validation elements 65 are configured so as to activate or deactivate one or more programmed automatic operations.

According to one embodiment, at least one preconfigured automatic operation is proposed by default. A user can activate or not activate this preconfigured automatic operation, or modify it to adapt it to his or her practices.

In the above description, the terms "first icon" and "second icon" have a chronological meaning, the second icon being selected after, in time, the selection of the first icon.

In order to make it possible to implement the invention, the control device according to the invention comprises all the hardware and/or software elements implementing steps or all the steps of the operating method according to the invention. Notably, the device comprises:
- an element for selecting an icon representing a first condition of implementation of an action relating to the installation out of a proposed set of condition icons,
- an element for positioning the first selected condition in a matrix table accommodating the condition icons,
- an element for selecting an icon representing a second condition of implementation of an action relating to the installation,
- an element for positioning the icon representing the second condition on a same row or a same column as the icon representing the first condition in the matrix table.

One and the same element may make it possible to implement a number of steps.

The geographic position information or geographic localisation information may be known using a wireless local area network or using a cell phone network or using a GPS device.

The invention claimed is:

1. Method for operating a control device of a home automation installation of a building and of the environment of the building,
   the home automation installation comprising a plurality of home automation equipment items and sensors placed in living areas inside and/or outside the building,
   the control device comprising a data input device and a display device,
   the display device comprising a graphic representation screen,
   the control device being configured so as to control the operation of the home automation equipment items and communicate with the sensors,
   the method comprising at least the following automatic operation configuration steps, the automatic operation being defined by at least first and second conditions of implementation of an action and by the action itself:
   providing an action matrix table visible on the graphic representation screen for accommodating an action icon or respective action icons representing actions among a first proposed set of actions representing actions different from one another,
   selecting an action icon representing an action out of the first proposed set of action icons,
   positioning the selected action icon representing the action in a selected position in the action matrix table, wherein the action icon is visible on the graphic representation screen at the selected position in the action matrix table
   providing a condition matrix table visible on the graphic representation screen for accommodating respective condition icons representing conditions of implementation of the action among a proposed set of condition icons representing different conditions from one another,
wherein the condition matrix table comprises a plurality of rows and a plurality of columns visible on the graphic representation screen,
wherein the condition matrix table is configured so that
(i) the conditions of implementation of the action are separated by a logical OR when the respective condition icons are positioned in a same row of the condition matrix table and the conditions of implementation of the action are separated by a logical AND when the respective condition icons are positioned in a same column of the condition matrix table,
or
(ii) the conditions of implementation of the action are separated by a logical AND when the respective condition icons are positioned in a same row of the condition matrix table and the conditions of implementation of the action are separated by a logical OR when the respective condition icons are positioned in a same column of the condition matrix table,
selecting a first icon representing the first condition of implementation of the action relating to the installation out of the proposed set of condition icons,
positioning the selected first icon representing the first condition of implementation of the action in a first position in the condition matrix table, wherein the first icon is visible on the graphic representation screen at the first position in the condition matrix table,
selecting a second icon representing the second condition of implementation of the action relating to the installation out of the proposed set of condition icons,
positioning the selected second icon representing the second condition of implementation of the action in a second position on a same row or on a same column as the first icon representing the first condition in the condition matrix table, wherein the second icon is visible on the graphic representation screen at the second position in the condition matrix table,
so that the positioning of the action icon in the action matrix table controls the configuration of the action to be implemented in automatic operation, and the positioning of the selected first and second condition icons on the same row or on the same column of the condition matrix table controls the configuration of the control device to implement the selected action in automatic operation.

2. The method according to claim 1, wherein the selection of the icon representing the second condition is dependent on the first condition selected.

3. The method according to claim 1, wherein the selection and positioning are reiterated as many times as there are conditions desired for the implementation of the action.

4. The method according to claim 1, wherein the number of possible conditions, separated by a logical AND, is less than or equal to 3.

5. The method according to claim 1, wherein the condition icons include at least two different icons representing at least two different conditions selected from the group consisting of:
conditions defined relative to time information,
conditions defined relative to weather or climate information,
conditions defined relative to installation equipment item position or status information,
conditions defined relative to sensor measurement information or sensor status information,
conditions defined relative to information relating to a user, and
conditions defined relative to localisation information.

6. The method according to claim 1, comprising at least one step of parameterizing at least one of the first condition and the second condition selected.

7. The method according to claim 1, comprising at least one step of selection and of positioning of the icon representing a second action relating to the installation out of the first proposed set of actions.

8. The method according to claim 7, wherein the selection and positioning of an action is reiterated as many times as the number of actions desired for one and the same set of conditions.

9. The method according to claim 6, wherein the selection of the second action is dependent on the first action selected.

10. The method according to claim 1, wherein the action is chosen from the following types of actions:
change of state of an equipment item,
activation of a preprogrammed mode of operation of the installation,
launching of a scenario,
sending of an alert.

11. The method according to claim 1, wherein the selection and positioning comprise dragging-dropping an icon from a set to a display area.

12. The method according to claim 1, wherein the selecting involves the opening of a separate graphic window comprising parameterizing information.

13. The method according to claim 1, comprising displaying an automatic operation icon and different condition type icons associated with the automatic operation, the condition type icons representing the types of conditions of implementation of the automatic operation separated by a logical AND.

14. The method according to claim 1, comprising displaying all of the configured automatic operations, the displaying comprising a highlighted display of icons representing the active conditions and/or a highlighted display of icons representing conditions for which the status is defined as true.

15. The method according to claim 1, comprising activating and deactivating a configured automatic operation.

16. The method according to claim 1, comprising providing at least one preconfigured automatic operation.

17. A control device of a home automation installation of a building and of the environment of the building, the home automation installation comprising a plurality of home automation equipment items and sensors placed in living areas inside and/or outside the building, the control device being configured so as to control the operation of the home automation equipment items and communicate with the sensors and comprising:
a data input device and a display device,
a graphic representation screen,
hardware and/or software elements configured for implementing an operating method comprising at least the following automatic operation configuration steps, the automatic operation being defined by at least first and second conditions of implementation of an action and by the action itself:

providing an action matrix table visible on the graphic representation screen for accommodating an action icon or respective action icons representing actions among a first proposed set of actions representing actions different from one another, selecting an action icon representing an action out of the first proposed set of action icons, positioning the selected action icon representing the action in a selected position in the action matrix table, wherein the action icon is visible on the graphic representation screen at the selected position in the action matrix table, providing a condition matrix table visible on the graphic representation screen for accommodating respective condition icons representing conditions of implementation of the action among a proposed set of condition icons representing different conditions from one another, wherein the condition matrix table comprises a plurality of rows and a plurality of columns visible on the graphic representation screen, wherein the condition matrix table is configured so that (i) the conditions of implementation of the action are separated by a logical OR when the respective condition icons are positioned in a same row of the condition matrix table and the conditions of implementation of the action are separated by a logical AND when the respective condition icons are positioned in a same column of the condition matrix table, or (ii) the conditions of implementation of the action are separated by a logical AND when the respective condition icons are positioned in a same row of the condition matrix table and the conditions of implementation of the action are separated by a logical OR when the respective condition icons are positioned in a same column of the condition matrix table, selecting a first icon representing the first condition of implementation of the action relating to the installation out of the proposed set of condition icons, positioning the selected first icon representing the first condition of implementation of the action in a first position in the condition matrix table, wherein the first icon is visible on the graphic representation screen at the first position in the condition matrix table, selecting a second icon representing the second condition of implementation of the action relating to the installation out of the proposed set of condition icons, positioning the selected second icon representing the second condition of implementation of the action in a second position on a same row or on a same column as the first icon representing the first condition in the condition matrix table, wherein the second icon is visible on the graphic representation screen at the second position in the condition matrix table, so that the positioning of the action icon in the action matrix table controls the configuration of the action to be implemented in automatic operation, and the positioning of the selected first and second condition icons on the same row or on the same column of the condition matrix table controls the configuration of the control device to implement the selected action in automatic operation.

18. The control device according to claim 17, which comprises a terminal, said terminal comprising the data input device and the display device.

19. The control device according to claim 18, wherein said terminal is a mobile terminal.

20. Computer program stored in a non-transitory data storage medium, readable by a computer, comprising computer program code elements suitable for implementing a method for operating a control device of a home automation installation of a building and of the environment of the building, the home automation installation comprising a plurality of home automation equipment items and sensors placed in living areas inside and/or outside the building, the control device comprising a data input device and a display device, the display device comprising a graphic representation screen, the control device being configured so as to control the operation of the home automation equipment items and communicate with the sensors, the method comprising at least the following automatic operation configuration steps, the automatic operation being defined by at least first and second conditions of implementation of an action and by the action itself:

providing an action matrix table visible on the graphic representation screen for accommodating an action icon or respective action icons representing actions among a first proposed set of actions representing actions different from one another, selecting an action icon representing an action out of the first proposed set of action icons, positioning the selected action icon representing the action in a selected position in the action matrix table, wherein the action icon is visible on the graphic representation screen at the selected position in the action matrix table, providing a condition matrix table visible on the graphic representation screen for accommodating respective condition icons representing conditions of implementation of the action among a proposed set of condition icons representing different conditions from one another, wherein the condition matrix table comprises a plurality of rows and a plurality of columns visible on the graphic representation screen, wherein the condition matrix table is configured so that (i) the conditions of implementation of the action are separated by a logical OR when the respective condition icons are positioned in a same row of the condition matrix table and the conditions of implementation of the action are separated by a logical AND when the respective condition icons are positioned in a same column of the condition matrix table, or (ii) the conditions of implementation of the action are separated by a logical AND when the respective condition icons are positioned in a same row of the condition matrix table and the conditions of implementation of the action are separated by a logical OR when the respective condition icons are positioned in a same column of the condition matrix table, selecting a first icon representing the first condition of implementation of the action relating to the installation out of the proposed set of condition icons, positioning the selected first icon representing the first condition of implementation of the action in a first position in the condition matrix table, wherein the first icon is visible on the graphic representation screen at the first position in the condition matrix table, selecting a second icon representing the second condition of implementation of the action relating to the installation out of the proposed set of condition icons, positioning the selected second icon representing the second condition of implementation of the action in a second position on a same row or on a same column as the first icon representing the first condition in the condition matrix table, wherein the second icon is visible on the graphic representation screen at the second position in the condition matrix table, so that the positioning of the action icon in the action matrix table controls the configuration of the action to be implemented in automatic operation, and the positioning of the selected first and second condition icons on the same row or on the same column of the condition matrix table controls the configuration of the control device to implement the selected action in automatic operation.

21. Non-transitory storage medium, readable by a computer, comprising the computer program according to claim 20.

22. Home automation installation of a building and of the environment of the building comprising a plurality of home automation equipment items and sensors placed in living areas inside and outside the building, the home automation installation comprising:

the control device according claim 17, and a communication device through which the control device can drive the equipment items and the sensors of the installation by the implementation of a programmed automatic operation.

23. The control device according to claim 17, wherein the hardware and/or software elements include an element for selecting an icon, an element for positioning the selected icon on an area of the graphic representation screen and a computation element determining a list of icons or of parameters to be displayed as a function of the selected icon or icons.

24. The method according to claim 5, wherein the condition is chosen from the conditions defined relative to a position of a bottom extremity of a screen or closed or open status of a screen.

25. The method according to claim 1, wherein the condition icons of the set are visible in a condition icon display area of the graphic representation screen.

26. The control device according to claim 17, wherein the condition icons of the set are visible in a condition icon display area of the graphic representation screen.

27. The method according to claim 1, wherein the action icons representing the first proposed set of actions different from one another are visible in a condition icon display area of the graphic representation screen.

28. The device according to claim 17, wherein hardware and/or software elements are configured for implementing at least one step of selection and of positioning of an action icon representing a first action relating to the installation out of a first proposed set of actions represented by a plurality of action icons representing different actions from one another, wherein the action icons are visible in a condition icon display area of the graphic representation screen.

29. The method according to claim 1, wherein, after each positioning of the respective first or second condition icon into the condition matrix table, the respective first or second condition icon also remain visible and available for selection in the condition icon display area.

30. The device according to claim 17, wherein the graphic representation screen is configured so that, after each positioning of the respective first or second condition icon into the condition matrix table, the respective first or second condition icon also remain visible and available for selection in the condition icon display area.

* * * * *